(12) United States Patent
Ohms

(10) Patent No.: US 9,927,240 B2
(45) Date of Patent: Mar. 27, 2018

(54) METHOD FOR TESTING THE FUNCTIONALITY OF A ROTATION RATE SENSOR

(71) Applicant: Robert Bosch GmbH, Stuttgart (DE)

(72) Inventor: Torsten Ohms, Vaihingen/Enz-Aurich (DE)

(73) Assignee: ROBERT BOSCH GMBH, Stuttgart (DE)

(*) Notice: Subject to any disclaimer, the term of this patent is extended or adjusted under 35 U.S.C. 154(b) by 176 days.

(21) Appl. No.: 14/950,937

(22) Filed: Nov. 24, 2015

(65) Prior Publication Data

US 2016/0169933 A1   Jun. 16, 2016

(30) Foreign Application Priority Data

Dec. 15, 2014 (DE) .................. 10 2014 225 844

(51) Int. Cl.
*G01C 19/5705* (2012.01)
*G01C 19/5726* (2012.01)

(52) U.S. Cl.
CPC ..... *G01C 19/5705* (2013.01); *G01C 19/5726* (2013.01)

(58) Field of Classification Search
CPC .................. G01C 19/5705; G01C 19/5726
See application file for complete search history.

(56) References Cited

U.S. PATENT DOCUMENTS

| | | | | |
|---|---|---|---|---|
| 5,955,668 A | * | 9/1999 | Hsu .............. | G01C 19/5719 73/1.37 |
| 6,089,089 A | * | 7/2000 | Hsu .............. | G01C 19/5719 73/1.77 |
| 2006/0150745 A1 | * | 7/2006 | Lang ............. | G01C 19/5712 73/849 |
| 2008/0190199 A1 | * | 8/2008 | Prandi ........... | G01C 19/5726 73/504.12 |
| 2010/0251800 A1 | * | 10/2010 | Mueck ........... | G01P 15/125 73/1.38 |
| 2013/0233048 A1 | | 9/2013 | Anac et al. | |
| 2013/0239651 A1 | | 9/2013 | Donadel et al. | |
| 2015/0377625 A1 | * | 12/2015 | Aaltonen ........ | G01C 19/5776 73/504.12 |

* cited by examiner

*Primary Examiner* — Francis Gray
(74) *Attorney, Agent, or Firm* — Norton Rose Fulbright US LLP; Gerard Messina

(57) ABSTRACT

A method for testing the functionality of a rotation rate sensor, the rotation rate sensor including a substrate and a micromechanical structure oscillatory with respect to the substrate having a first drive element, a second drive element and at least one Coriolis element, the Coriolis element being excitable to at least one oscillation mode by the first drive element and/or by the second drive element, a detection signal being detected as a function of a force action to be detected on the Coriolis element, the rotation rate sensor being operable optionally in a normal mode or in a self-test mode, the first drive element and the second drive element being driven in the normal mode, characterized in that in the self-test mode, the first drive element or the second drive element is driven optionally exclusively.

9 Claims, 3 Drawing Sheets

METHOD FOR TESTING THE FUNCTIONALITY OF A ROTATION RATE SENSOR

RELATED APPLICATION INFORMATION

The present application claims priority to and the benefit of German patent application no. 10 2014 225 844.8, which was filed in Germany on Dec. 15, 2014, the disclosure of which is incorporated herein by reference.

FIELD OF THE INVENTION

The present invention is directed to a method for testing the functionality of a rotation rate sensor.

BACKGROUND INFORMATION

Such methods are generally believed to be understood. For example, the publication US 2013/0239651 A1 is directed to a rotation rate sensor, which includes a body and a seismic mass. The seismic mass is attached to the body elastically and has a degree of freedom in sensing direction. The rotation rate sensor has a self-test actuator. Furthermore, it is believed to be understood from the publication US 2013/0233048 A1 that two self-test actuator electrodes are used in the self-test. A self-test of a rotation rate sensor is discussed in the publication EP 2 647 954 A2, in which capacitive MEMS sensors and a switch circuit are used. A testing of the functionality of a rotation rate sensor without additional circuits and/or additional electrodes is not provided.

SUMMARY OF THE INVENTION

In contrast to the related art, the method according to the present invention for testing the functionality of a rotation rate sensor as recited in the subordinated claims has the advantage that no additional components are used for testing the functionality in order to excite the micromechanical structure. This is achieved in that in the self-test mode, the first drive element or the second drive element is driven optionally exclusively.

The method according to the present invention for testing the functionality of a rotation rate sensor advantageously makes it possible to test the functionality of a rotation rate sensor without the use of additional components. It is consequently possible to reduce the manufacturing costs significantly. Moreover, the use of the same electrodes in the test mode and in the normal mode also makes it possible to detect damages of the electrodes, which are used for the drive.

Advantageous embodiments and refinements of the present invention may be derived from the further descriptions herein as well as the description with reference to the drawings.

According to one refinement, it is provided that during an initial calibration step in the self-test mode, a detection signal is stored in a memory unit as a detection signal to be expected. The calibration may be carried out during manufacturing. This advantageously makes it possible to record the detection signal to be expected at the end of the manufacturing process.

According to one refinement, it is provided that during a self-test step in a comparison unit, the detection signal in the self-test mode is compared with the expected detection signal. The self-test step may be carried out after transport and installation of the rotation rate sensor or during operation. After transport and installation, it is advantageously possible during the use of the rotation rate sensor to compare the measured detection signal in the self-test mode with the expected detection signal.

According to one refinement, it is provided that the comparison unit generates a piece of error information if the difference of the detection signal in the self-test mode and of the expected detection signal exceeds a predefined value. It is in particular possible to detect errors such as transport damages in the form of breaks in the mechanical structure or the fixed electrodes, stress influence due to damage of the housing or stress influence due to soldering. Stress influence due to damage of the housing or stress influence due to soldering may result in warping of the substrate, which in turn may result in a change of the distances of the micromechanical structure to the electrodes.

Another object of the present invention is a rotation rate sensor including a substrate and a micromechanical structure oscillatory with respect to the substrate having a first drive element, a second drive element and at least one Coriolis element, the substrate having a main plane of extension, the rotation rate sensor being configured in such a way that the Coriolis element is excitable to at least one oscillation mode by the first drive element and/or by the second drive element, the rotation rate sensor including a arrangement of detection for detecting a force action to be detected on the Coriolis element, the rotation rate sensor being configured in such a way that the rotation rate sensor is operable optionally in a normal mode or in a self-test mode, the rotation rate sensor being configured in such a way that the first drive element and the second drive element are driven in the normal mode, characterized in that the rotation rate sensor is configured in such a way that in the self-test mode, the first drive element or the second drive element is driven optionally exclusively. The implementation of a self-test of a rotation rate sensor without the use of additional circuits or additional electrodes for exciting the micromechanical structure makes it possible to implement a rotation rate sensor having a self-test function in a particularly cost-effective way.

According to one refinement, it is provided that the Coriolis element has a first Coriolis element and a second Coriolis element, and the Coriolis element carries out a drive movement essentially in parallel to the main plane of extension of the rotation rate sensor and, in the case of a rotation rate to be detected, it experiences a force action along a detection direction, the detection direction extending perpendicularly to the main plane of extension.

According to one alternative specific embodiment of the present invention, the drive movement essentially occurs in a direction perpendicular to the main plane of extension of the substrate.

According to another alternative specific embodiment of the present invention, the drive movement occurs essentially in parallel to the x-axis.

This advantageously makes it possible for a detection signal to be detected as a function of a force action to be detected on the Coriolis element.

DETAILED DESCRIPTION

Figure 1:
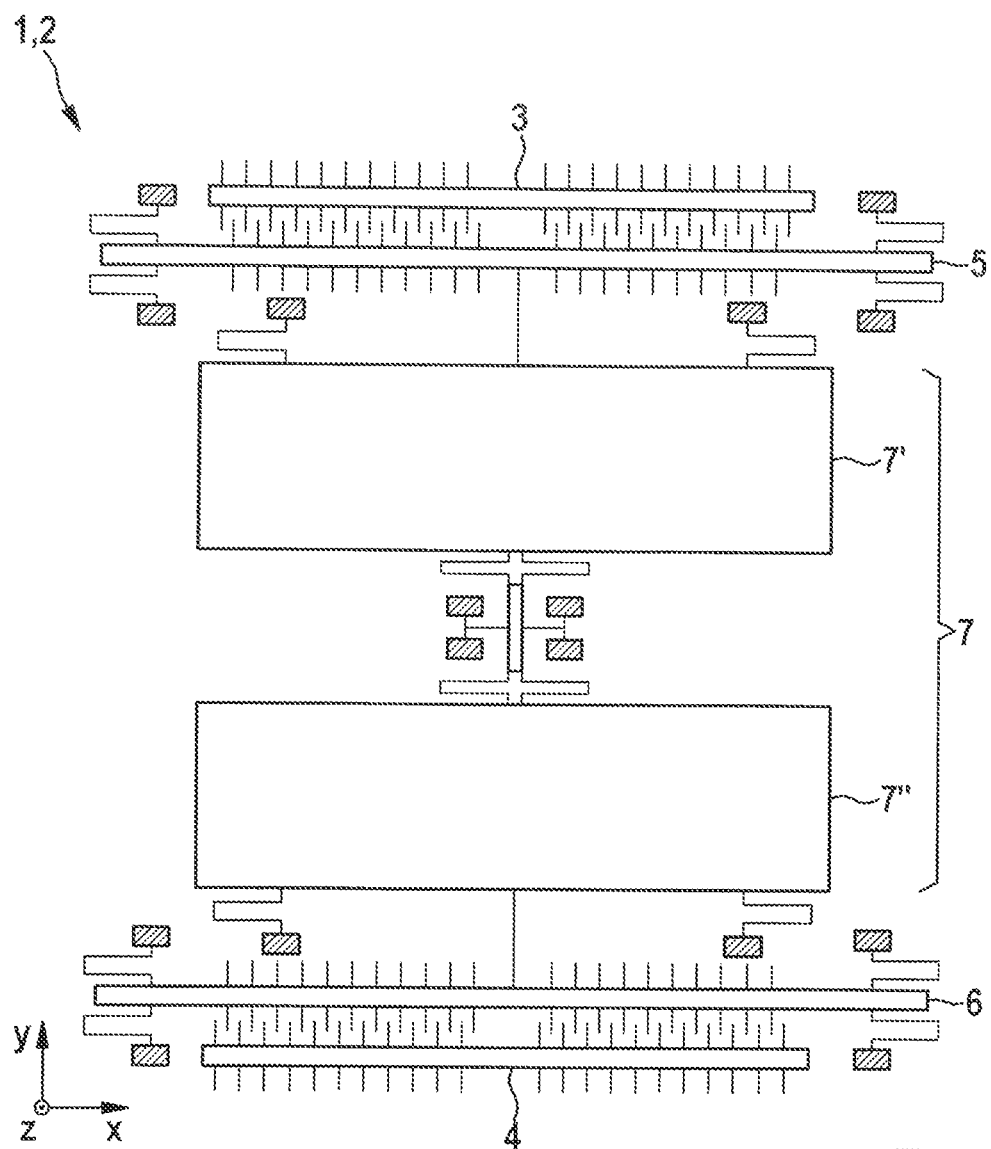
FIG. 1 shows a schematic top view of a rotation rate sensor including drive elements and Coriolis elements according to one exemplary specific embodiment of the present invention.

Identical components are consistently provided with the same reference numerals in the various drawings and are therefore generally named or mentioned only once.

In FIG. 1, a schematic top view of a rotation rate sensor 1 according to one exemplary specific embodiment of the present invention is shown, rotation rate sensor 1 having a substrate and a micromechanical structure 2 oscillatory with respect to the substrate. Rotation rate sensor 1 has a first drive comb 3 and a second drive comb 4, first drive comb 3 and second drive comb 4 being provided fixed to the substrate. Micromechanical structure 2 includes a first drive element 5, a second drive element 6, a first Coriolis element 7' and a second Coriolis element 7", these elements being elastically suspended on the substrate.

For example, rotation rate sensor 1 is configured for detecting a rotation rate about an axis parallel to the main plane of extension of rotation rate sensor 1 (either as a so-called $\Omega_x$ Sensor or as a so-called $\Omega_y$ Sensor), the detection occurring perpendicularly to the main plane of extension (z-axis). During operation of the rotation rate sensor in the normal mode (i.e., for detecting a rotation rate), drive elements 5 and 6 are driven to oscillate by voltages which are variable over time, which may be at or near the resonance frequency, drive elements 5 and 6 carrying out a movement in parallel to the main plane of extension, for example, in the y-direction. In this connection, a voltage which is variable over time between first drive comb 3 and first drive element 5 causes a force action on first drive element 5, and a voltage which is variable over time between second drive comb 4 and second drive element 6 causes a force action on second drive element 6. First drive element 5 in the drive direction is mechanically rigidly coupled to first Coriolis element 7' and second drive element 6 also in the drive direction is mechanically rigidly coupled to second Coriolis element 7". First Coriolis element 7' and second Coriolis element 7" are also denoted in the following as Coriolis element 7. As a result of the drive, Coriolis element 7 carries out a movement essentially in parallel to the main plane of extension. In the normal mode, a detection signal is detected as a function of a force action to be detected on Coriolis element 7. In this connection, the Coriolis force to be detected is detected along a detection direction which, in the exemplary embodiment of the rotation rate sensor, extends perpendicularly to the main plane of extension.

The rotation rate sensor has a normal mode and a self-test mode. In the normal mode, both first drive element 5 as well as second drive element 6 are driven symmetrically and synchronously. In the self-test mode, first drive element 5 or second drive element 6 is driven optionally exclusively. This makes it possible to test the functionality of the rotation rate sensor without using additional components. At the end of the manufacturing process, a detection signal is measured during a self-test step and stored in a memory unit as a detection signal to be expected. A detection signal to be expected may be in each case stored in the memory unit both for the drive of first drive element 5 as well as for the drive of second drive element 6. During the use of the rotation rate sensor, the detection signal measured in the self-test mode is compared with the particular detection signal to be expected in a comparison unit.

In the normal mode, the deflection of first Coriolis element 7' is detected with the aid of a first arrangement for detection 8' and the deflection of second Coriolis element 7" is detected with the aid of a second arrangement for detection 8". In a differential evaluation, a detection signal results from a signal of first arrangement of detection 8' and a signal of second arrangement of detection 8".

Figure 2:
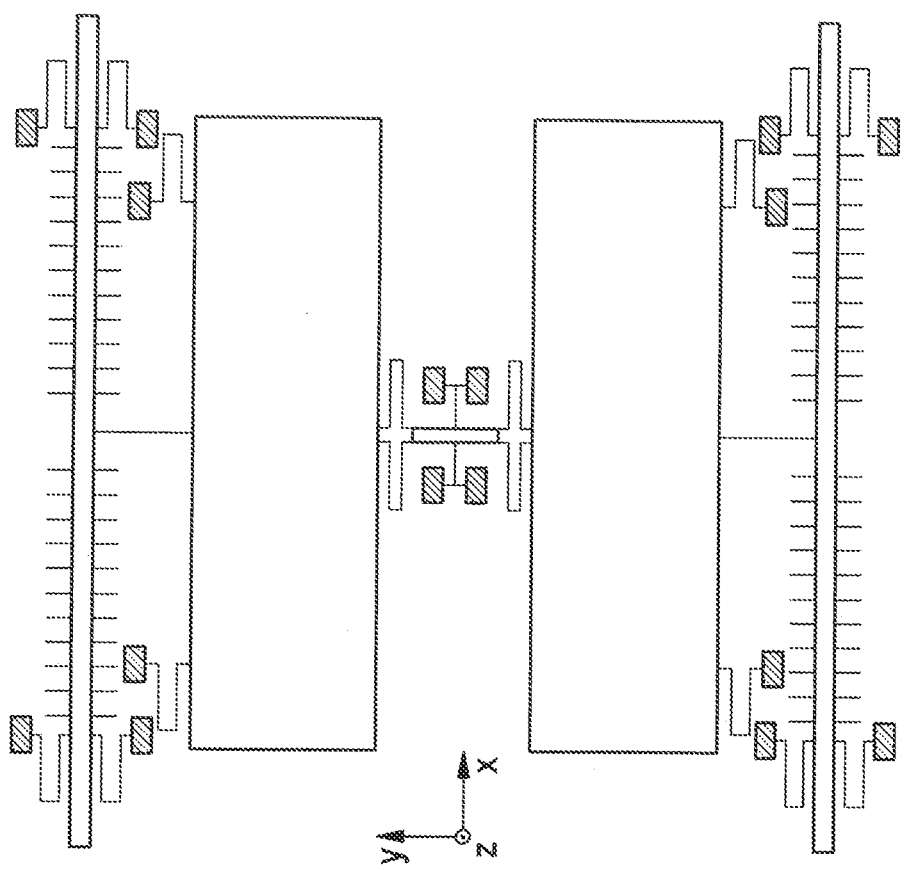
FIG. 2 shows the rotation rate sensor in a side view, the levitation forces being illustrated by arrows, in the normal mode and a schematic top view of the rotation rate sensor according to the exemplary specific embodiment of the present invention.
Figure 2:
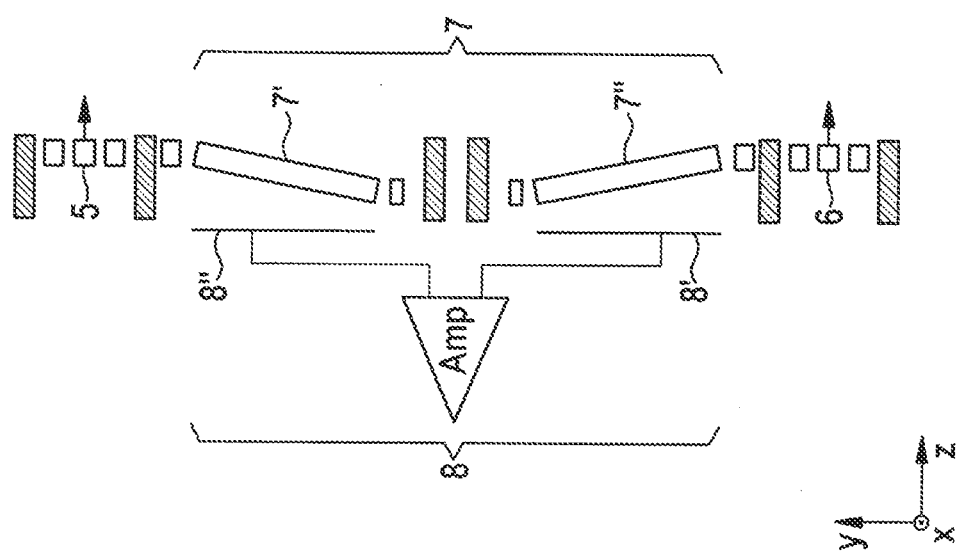

In particular due to manufacturing-related tolerances, apart from the desired component in parallel to the main plane of extension (xy-plane), the drive movement of drive elements 5 and 6 also has a component perpendicular to the main plane of extension (z-direction). The component of the drive movement perpendicular to the main plane of extension (z-direction) is attributable to the asymmetry of the E-field, resulting in so-called levitation forces. On the left side, FIG. 2 shows rotation rate sensor 1 in the normal mode in the side view, the levitation forces being illustrated by the arrows coming from the drive elements, according to the exemplary specific embodiment of the present invention. From the side view according to FIG. 2, it is evident that in the normal mode, the drive-induced deflection of first Coriolis element 7' and of second Coriolis element 7" in the z-direction, i.e., the levitation forces, are of essentially equal size. Due to the differential evaluation of the detection signal with the aid of first arrangement of detection 8' and of second arrangement of detection 8", the effect which the component of the drive movement in the detection direction (z-direction) has on the detection signal is eliminated in the normal mode.

Figure 3:
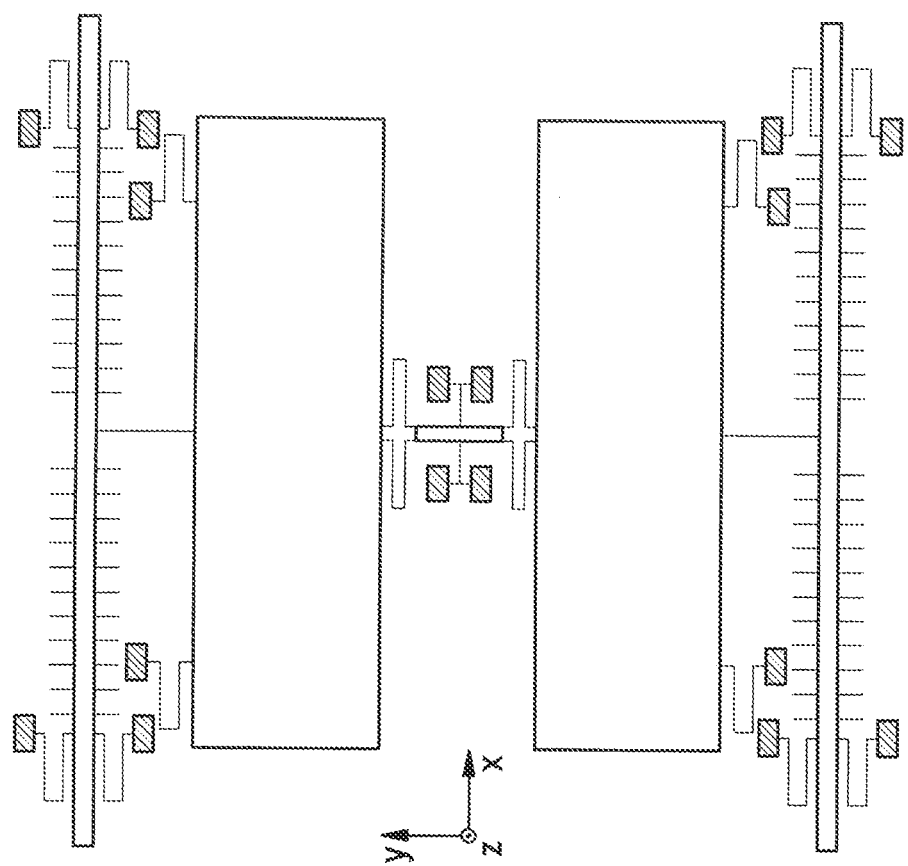
FIG. 3 shows the rotation rate sensor in a side view, the levitation forces being illustrated by arrows, in the self-test mode and a schematic top view of the rotation rate sensor according to the exemplary specific embodiment of the present invention.
Figure 3:
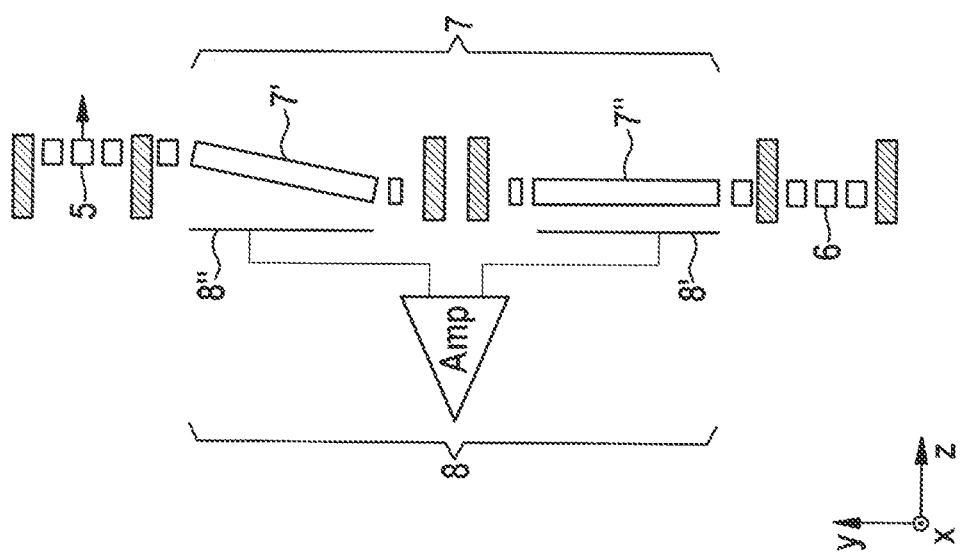

On the left side, FIG. 3 shows rotation rate sensor 1 in the side view, the levitation forces being illustrated by arrows, in an exemplary self-test mode in which first drive element 5 is driven exclusively according to the exemplary specific embodiment of the present invention. In the side view according to FIG. 3, the deflection of first Coriolis element 7' and the levitation forces acting on first drive element 5 are apparent. In this illustration, only first drive element 5 is excited by a voltage, which is variable over time, between first drive comb 3 and first drive element 5. The selective excitation of first drive element 5 or of second drive element 6 in the self-test mode, which is optionally exclusive, causes an offset to act, which shifts the zero position of the sensor. The shift results from the design of the micromechanical structure and should be stable over the service life, as long as the micromechanical structure does not change its properties. Stress influence due to damage of the housing or stress influence due to soldering may result in warping of the substrate, which in turn may result in a change of the distances of the micromechanical structure to the electrodes. The comparison of the detection signal in the self-test mode during use of the rotation rate sensor with the detection signal to be expected in a comparison unit makes it possible to detect errors such as transport damage in the form of breaks in the mechanical structure or the fixed electrodes, stress influence due to damage of the housing or stress influence due to soldering.

What is claimed is:

1. A method for testing a functionality of a rotation rate sensor, the method comprising:
   exciting at least one Coriolis element of the rotation rate sensor to at least one oscillation mode by a first drive element and/or by a second drive element, wherein the rotation rate sensor includes a substrate and a micromechanical structure oscillatory with respect to the substrate having the first drive element, the second drive element and the at least one Coriolis element; and
detecting a detection signal as a function of a force action to be detected on the Coriolis element, the rotation rate sensor being operable optionally in a normal mode or in a self-test mode, the first drive element and the second drive element being driven in the normal mode;
wherein in the self-test mode, the first drive element or the second drive element is driven optionally exclusively.

2. The method of claim 1, wherein, during an initial calibration task in the self-test mode, a detection signal is stored in a memory unit as a detection signal to be expected.

3. The method of claim 1, wherein, during a self-test task, the detection signal in the self-test mode is compared with the expected detection signal.

4. The method of claim 1, wherein a piece of error information is generated if the difference of the detection signal in the self-test mode and of the expected detection signal exceeds a predefined value.

5. A rotation rate sensor, comprising:
a substrate;
a micromechanical structure oscillatory with respect to the substrate having a first drive element, a second drive element and at least one Coriolis element, the substrate having a main plane of extension, the rotation rate sensor being configured so that the Coriolis element is excitable to at least one oscillation mode by the first drive element and/or by the second drive element;
a detection arrangement to detect a force action to be detected on the Coriolis element, the rotation rate sensor being configured so that the rotation rate sensor is operable optionally in a normal mode or in a self-test mode, the rotation rate sensor being configured so that the first drive element and the second drive element are driven in the normal mode, wherein the rotation rate sensor is configured so that in the self-test mode, the first drive element or the second drive element is driven optionally exclusively.

6. The rotation rate sensor of claim 5, wherein the at least one Coriolis element includes a first Coriolis element and a second Coriolis element, and wherein the Coriolis element carries out a drive movement essentially in parallel to the main plane of extension of the rotation rate sensor and, in the case of a rotation rate to be detected, it experiences a force action along a detection direction, the detection direction extending perpendicularly to the main plane of extension.

7. A method for testing a functionality of a rotation rate sensor, the method comprising:
exciting at least one Coriolis element of the rotation rate sensor to at least one oscillation mode by a first drive element and/or by a second drive element, wherein the rotation rate sensor includes a substrate and a micromechanical structure oscillatory with respect to the substrate having the first drive element, the second drive element and the at least one Coriolis element; and
detecting a detection signal as a function of a force action to be detected on the Coriolis element, the rotation rate sensor being operable optionally in a normal mode or in a self-test mode, the first drive element and the second drive element being driven in the normal mode;
wherein in the self-test mode, the first drive element or the second drive element is driven optionally exclusively,
wherein, during a self-test task, the detection signal in the self-test mode is compared with the expected detection signal.

8. A method for testing a functionality of a rotation rate sensor, the method comprising:
exciting at least one Coriolis element of the rotation rate sensor to at least one oscillation mode by a first drive element and/or by a second drive element, wherein the rotation rate sensor includes a substrate and a micromechanical structure oscillatory with respect to the substrate having the first drive element, the second drive element and the at least one Coriolis element; and
detecting a detection signal as a function of a force action to be detected on the Coriolis element, the rotation rate sensor being operable optionally in a normal mode or in a self-test mode, the first drive element and the second drive element being driven in the normal mode;
wherein in the self-test mode, the first drive element or the second drive element is driven optionally exclusively,
wherein a piece of error information is generated if the difference of the detection signal in the self-test mode and of the expected detection signal exceeds a predefined value.

9. A rotation rate sensor, comprising:
a substrate;
a micromechanical structure oscillatory with respect to the substrate having a first drive element, a second drive element and at least one Coriolis element, the substrate having a main plane of extension, the rotation rate sensor being configured so that the Coriolis element is excitable to at least one oscillation mode by the first drive element and/or by the second drive element;
a detection arrangement to detect a force action to be detected on the Coriolis element, the rotation rate sensor being configured so that the rotation rate sensor is operable optionally in a normal mode or in a self-test mode, the rotation rate sensor being configured so that the first drive element and the second drive element are driven in the normal mode,
wherein the rotation rate sensor is configured so that in the self-test mode, the first drive element or the second drive element is driven optionally exclusively, wherein the at least one Coriolis element includes a first Coriolis element and a second Coriolis element, and wherein the Coriolis element carries out a drive movement essentially in parallel to the main plane of extension of the rotation rate sensor and, in the case of a rotation rate to be detected, it experiences a force action along a detection direction, the detection direction extending perpendicularly to the main plane of extension.

* * * * *